(12) United States Patent
Morris et al.

(10) Patent No.: US 7,331,817 B1
(45) Date of Patent: Feb. 19, 2008

(54) MOBILE DEVICE WITH COUPLING ARRANGEMENT

(75) Inventors: Quintin Morris, Brooklyn, NY (US); JaeHo Choi, Whitestone, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 11/582,273

(22) Filed: Oct. 17, 2006

(51) Int. Cl.
*H01R 11/00* (2006.01)
(52) U.S. Cl. .......................................... 439/502; 439/37
(58) Field of Classification Search ................... 439/37, 439/502, 638
See application file for complete search history.

(56) References Cited

U.S. PATENT DOCUMENTS

| 3,662,078 | A | * | 5/1972 | Holiday | 434/317 |
| 5,018,044 | A | * | 5/1991 | Weiss | 361/220 |
| 7,186,137 | B2 | * | 3/2007 | Rock | 439/502 |

* cited by examiner

*Primary Examiner*—Khiem Nguyen
(74) *Attorney, Agent, or Firm*—Fay Kaplun & Marchin, LLP.

(57) ABSTRACT

An arrangement includes a first connector coupled to a first device and a second connector coupled to a second device. A cable connects the first and second connectors. At least a portion of the cable forms a substantially oval-shaped coil. At least one of the first and second devices is a user-wearable device.

20 Claims, 5 Drawing Sheets

MOBILE DEVICE WITH COUPLING ARRANGEMENT

FIELD OF THE INVENTION

The present invention generally relates to mobile devices.

BACKGROUND INFORMATION

A wearable device, such as a ring scanner, generally comprises a scanning unit coupled to a computing unit. The scanning unit acquires data and transmits the data to the computing unit via a coupling arrangement. One conventional coupling arrangement is a wired cord that is generally helical-shaped (e.g., a circular spiral). The cord comprises one or more wires covered in an insulating material, such as plastic or rubber. An advantage of forming the cord as a helix is that a length of the cord is reduced by winding the cord into compact coils. If the reduced length is insufficient to meet a user's needs, the cord can be stretched to its full length. The cord generally has elastic properties enabling it to return to a relaxed state when not acted upon by pulling forces.

FIG. 1 shows a perspective view of a mobile device 100. The device 100 includes a scanning arrangement 110 coupled to a triggering arrangement 120 and a cord 134. The scanning arrangement 110 may be a bar code scanner, an infrared sensor, an RFID reader, etc. The triggering arrangement 120 may include a trigger button 122 and a strap 124. As shown in FIG. 1, the cord 130 may include a helical section 134. A proximal end of the cord (not shown) is coupled to a computing unit worn by the user. For example, the computing unit can be worn on a wrist or a forearm, while the device 100 is worn on a finger.

Despite its advantages, a helical cord may be a potential source of inconvenience to the user. For example, if the computing unit is worn on the forearm, the cord 130 may be stretched to a length that makes the cord 130 uncomfortable. The stretching causes the cord 130 to be in a constant state of tension, limiting or making difficult movement of the device 100. As a result, the user may be required to exert a large amount of effort to position or maneuver the device 100. Over an extended period of use, this may result in user fatigue. In addition, friction from the cord 130 may cause further discomfort to the user. Another disadvantage is that if the computing unit is worn closer to the device 100 (e.g., at the wrist), the cord 130 can bow outward, obstructing the user's view of the computing unit and potentially getting tangled with itself or with another object. The force and length of cord required is also controlled by the diameter of the helix. If a low force, long cord is required in a short distance, it may be necessary to create a large diameter helix. The large diameter then presents itself as a hook point which could cause the user inconvenience.

SUMMARY OF THE INVENTION

The present invention relates to a first wearable device which includes a first connector; a second wearable device including a second connector; and a coupling arrangement coupling the first and second devices. The coupling arrangement includes a third connector coupled to the first connector, a fourth connector coupled to the second connector and at least one substantially oval-shaped coil connects the third and fourth connectors.

DETAILED DESCRIPTION

Figure 1:
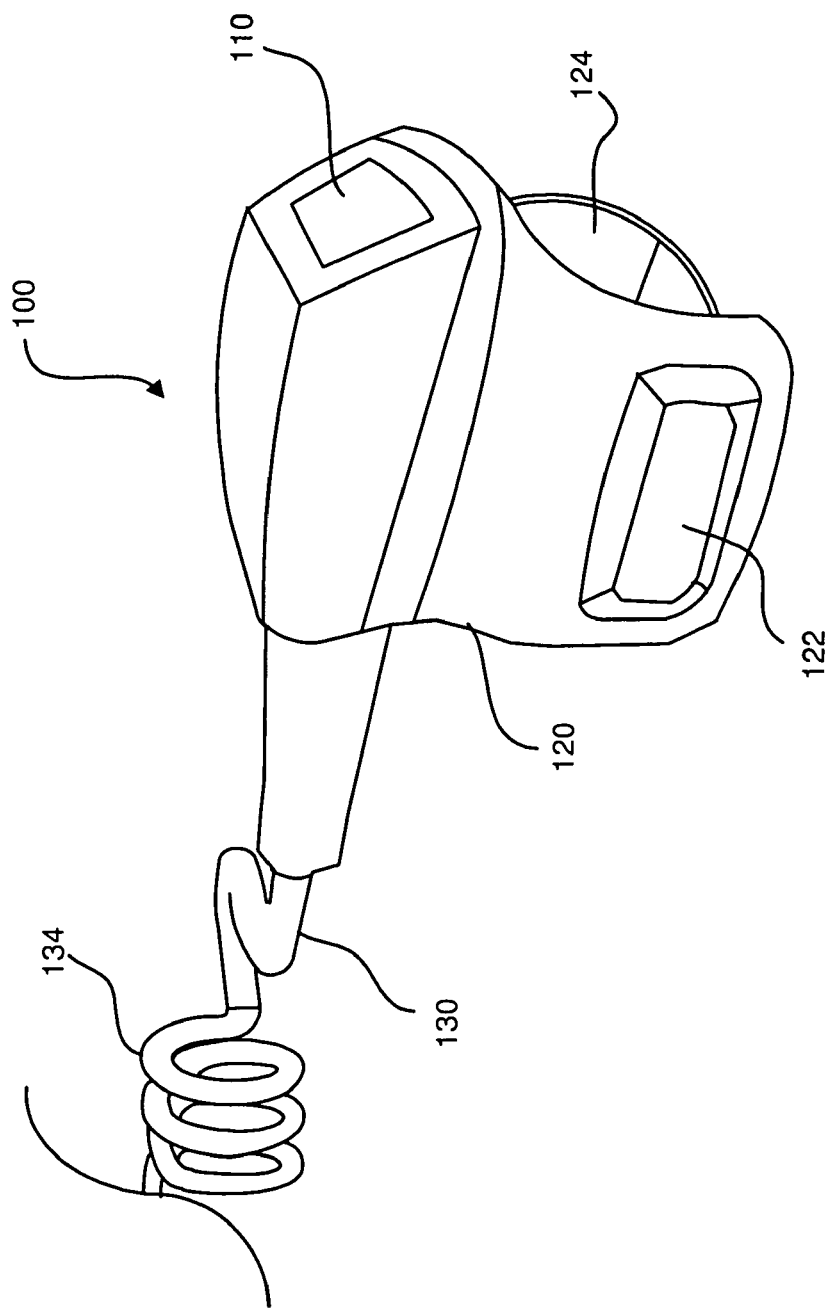
FIG. 1 is a perspective view of a mobile device with a conventional cord.

The present invention may be further understood with reference to the following description and the appended drawings, wherein like elements are provided with the same reference numerals. The present invention generally relates to mobile devices. For example, the mobile devices may be data acquisition devices, data processing devices, data transmission devices, audio/video devices, etc. An exemplary embodiment of the present invention is described with reference to a ring scanner, however those skilled in the art will understand that the present invention may be implemented with any type of mobile device that utilizes a corded coupling arrangement, (e.g., a wrist-mounted scanner, a glove scanner, an media (e.g., mp3, video, compact disc, etc.) player, a global positioning system, a walkie-talkie, a mobile computer, etc.).

Figure 2:
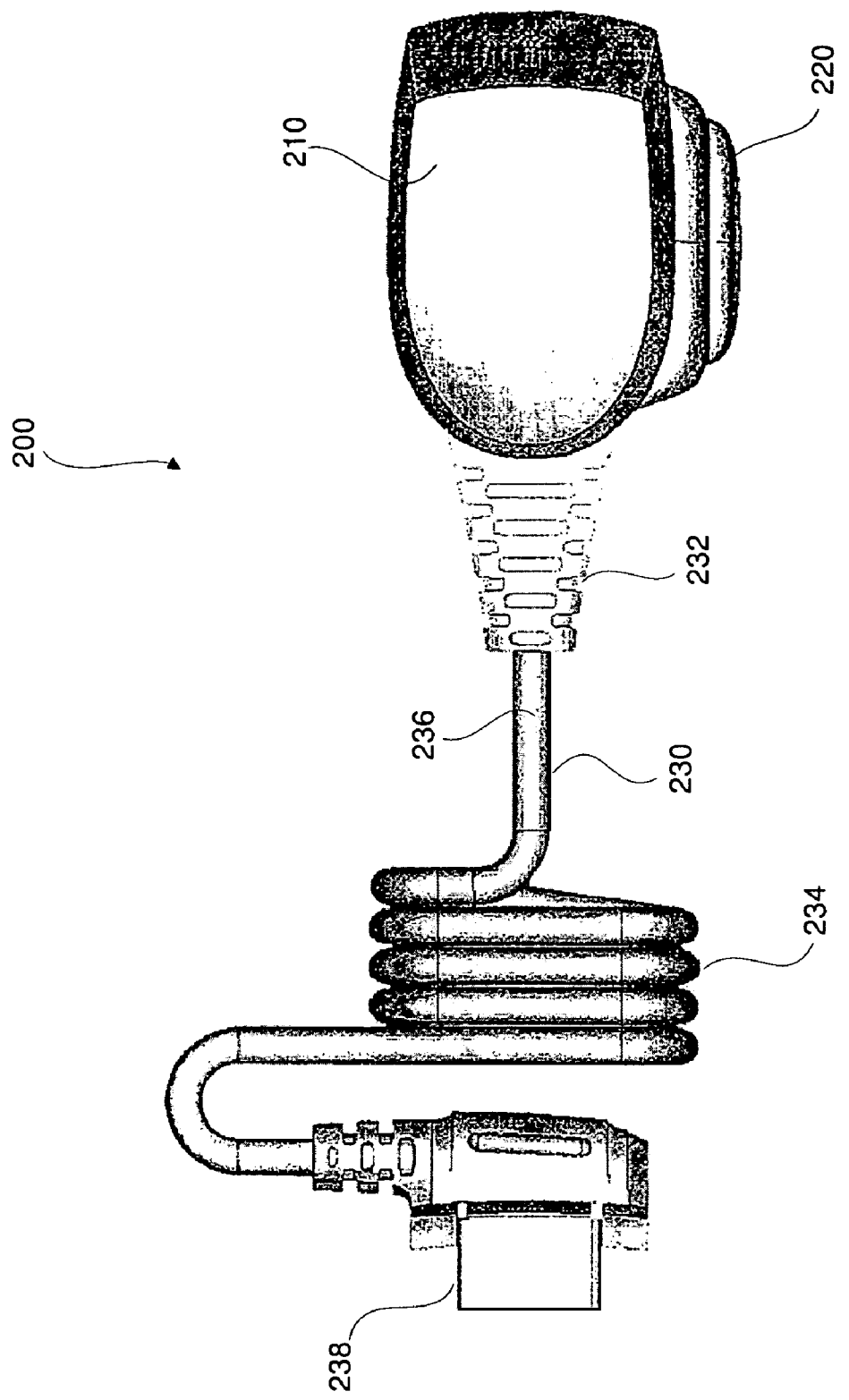
FIG. 2 is a top view of an exemplary embodiment of a mobile device according to the present invention.

FIG. 2 shows a top view of an exemplary embodiment of a data acquisition device (e.g., a ring scanner) 200 according to the present invention. The device 200 may include one or more data acquisition arrangements (e.g., a imager, a barcode scanner, an RFID reader, an keyboard, a touchpad, etc.) disposed within a housing 210. The device 200 may also include a trigger 220 coupled to the housing 210 for engaging the one or more data acquisition arrangements. The trigger 220 may be a pushbutton, a slide switch, a rocker switch, or any other mechanical and/or electrical triggering mechanism known to those skilled in the art. The housing 210 may be worn on at least one finger using an elastic strap, a band, or other conventional attachment arrangement. When worn, the housing 210 may be substantially parallel to an anterior surface of the finger, with the trigger 220 positioned along a medial side of the finger (e.g., proximal to an opposing thumb).

The device 200 may communicate with a computing device, such as a portable computer, a desktop computer, a PDA, a proprietary receiving unit, a mobile phone, a media player, etc. (not shown). The computing device may transmit or receive data and instructions to/from the device 200. For example, the computing device may receive data corresponding to an object scanned by the device 200. The computing device may also transmit instructions to the device 200 in order to specify a particular data format for receiving the data.

If the computing device is the portable computer or the desktop computer, it may not be worn by the user. For example, the computing device may be located on a desk or attached to a wall. If the computing device is the PDA or the proprietary unit, it may be worn on a body part (e.g., an upper arm, a forearm, a leg, etc.) of the user. Regardless of where the computing device is located, it is physically coupled to the device 200 via a wired cord 230, which provides a medium through which data and/or instruction signals are communicated between the computing device and the device 200. The medium may, for example, include one or more copper wires surrounded by an insulating material (e.g., rubber coating). The insulating material has an elastic property allowing the cord 230 to be stretched and bent while retaining the ability to return to an original shape. Although the elastic property may allow the cord 230 to return to the original shape when no longer stretched, it may be desirable to limit this elastic response in order to make wearing the device 200 more comfortable for the user. For example, if the elastic response is too strong, the user may experience fatigue when trying to maintain the cord 230 in a stretched position for an extended period of time. If the elastic response is too weak, the cord 230 may become permanently deformed over time as a result of repeated and/or excessive stretching. The insulating material may also be selected based on its dielectric properties in addition to other physical properties, such as smoothness (e.g., frictional coefficient), hardness, permeability, etc.

A connecting arrangement 238 is disposed on a proximal end of the cord 230. The connecting arrangement 238 may comprise a hardware connector for coupling to a receiving arrangement of the computing device. For example, in one embodiment, the connecting arrangement 238 may be a proprietary arrangement. In other embodiments, the connecting arrangement 238 may be a standardized arrangement (e.g., USB, parallel port, serial port, etc.). In one embodiment, the connecting arrangement 238 is detachably coupled to the receiving arrangement. However, in other embodiments, the connecting arrangement may be integral with the receiving arrangement of the computing device.

In an exemplary embodiment, the cord 230 may include a tapered distal section 232, a coiled proximal section 234, and a straight middle section 236. The tapered section 232 is located at a point where the cord 230 is coupled to the device 200 and may taper proximally towards the coiled section 234. The tapered section 232 is also substantially thicker than a remainder of the cord 230 and may include one or more grooves disposed around an outer surface thereof. The grooves allow the housing 210 to pivot and flex, while the thickness of the tapered section 232 protects the cord from damage and provides mechanical stability for the coupling point. A length of the tapered section 232 may be predetermined according to desired flexibility characteristics specified by a manufacturer of the device 200. Generally, the tapered section 232 is less flexible than the remainder of the cord 230. Accordingly, if a greater amount of flexibility is desired, the length of the tapered section 232 may be minimized. Similarly, if less flexibility is desired, the length of the tapered section 232 may be increased. The thickness of the tapered section 232 may also be predetermined in addition, or in alternative, to adjusting the length. For example, an increase in thickness may result in a corresponding decrease in flexibility.

In one embodiment, the tapered section 232 may be integral with the housing 210. For example, the tapered section 232 may be integrally formed with or permanently bonded, melded, etc. to the housing 210. In other embodiments, the tapered section 232 may be detachably coupled to the housing 210. Thus, the tapered section 232 may function as a removable plug, allowing the cord 230 and/or the computing device to be stored separately from the housing 210.

Figure 3:
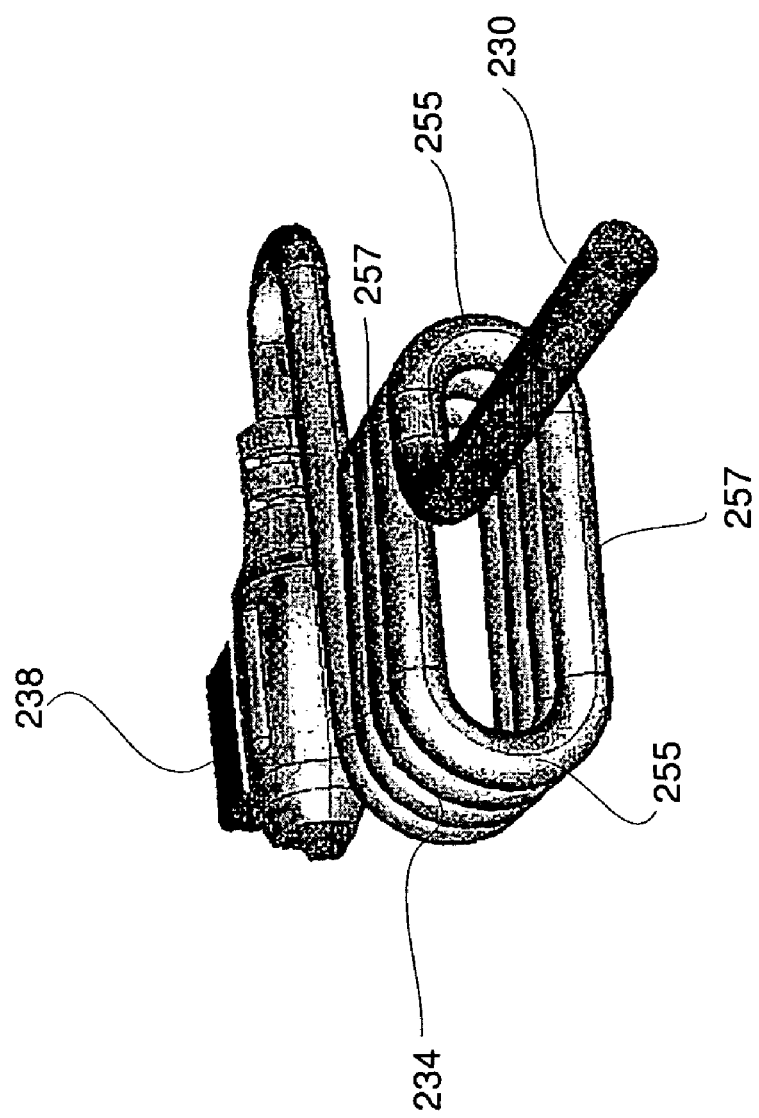
FIG. 3 is a perspective view of a portion of the device of FIG. 2.

The coiled section 234 includes a series of substantially oval-shaped coils. As best seen in FIG. 3, each coil comprises an opposing pair of semi-circular members 255 and a pair of opposing elongated members 257 that are substantially parallel to each other and joined at corresponding ends by a semi-circular member 255. The semi-circular members 255 and the elongated members 257 may be integrally formed using a shaping procedure, such as molding, extrusion, heat curing, etc. For example, the coiled section 234 may be molded integrally with the straight section 236 and wrapped into ovals prior to hardening/curing.

In an exemplary manufacturing process, a portion of a raw cord is wrapped around a mandrel into an oval shape. The cord may be wrapped around the mandrel in a direction opposite to that desired. The cord/mandrel assembly is then placed into an oven and heated up to soften the cord. Once the cord is sufficiently cooled, it is removed from the mandrel and has an oval shape. The cord is then turned-over on itself, which adds tension and springiness. Once flipped over on itself, the coil is oriented in the desired direction.

A length of the straight section 236 may be predetermined based on the manufacturer's specifications. For example, it may be specified that, when the computing device is worn at the wrist, the straight section 236 should not extend proximally past the wrist. Accordingly, in an exemplary embodiment, a combined length of the straight section 236 and the tapered section 232 may be approximately 1.6".

The dimensions of the semi-circular and elongated members 255, 257 may also be selected according to the manufacturer's specifications. Several dimensions, such as length, thickness and cross-sectional area, may be adjusted in accordance with desired performance characteristics. For example, increasing a height of each coil may result in an increase in cross-sectional area of each coil, since a radius of the semi-circular members 255 is enlarged. However, this may result in unnecessary bulk, making the cord 230 unwieldy. Furthermore, it may not be space-efficient since the empty space surrounded by the coil is increased. Accordingly, if the manufacturer desires to increase the length of the cord 230 without increasing the height, a length of the elongated members 255 may be increased instead. However, if the elongated members 255 are too long, the coils may become uncomfortably heavy or extend too much beyond the user's body (e.g., a side of the forearm). In an exemplary embodiment where the cord 230 is draped along the wrist, the radius of the semi-circular members 255 may be approximately 0.3" and the length of the elongated members 257 may be 0.6", making an overall length of each coil 1.6". In addition, the thickness may be such that a distance between outer edges of the elongate members 255 is approximately 0.586".

Another characteristic that may affect the length of the cord 230 is the number of coils in the coiled section 234. The length of the cord 230 may be increased by adding more coils to a design thereof. However, additional coils may have undesirable effects such as an increased bulk and an increased likelihood of kinking and tangling.

As discussed above, the dimensions of the cord 230 may be adjusted depending on where the device 200 is worn on the body. In an exemplary embodiment, the length of the cord 230 may be predetermined such that the length is appropriate for multiple body locations. For example, the cord 230 may be dimensioned so that the cord 230 is in a relaxed (e.g., coiled) stated when the computing device is worn at a first body location (e.g., the wrist) and in a stretched (e.g., straight) state when the computing device is worn at a second location (e.g., the wrist).

Figure 4:
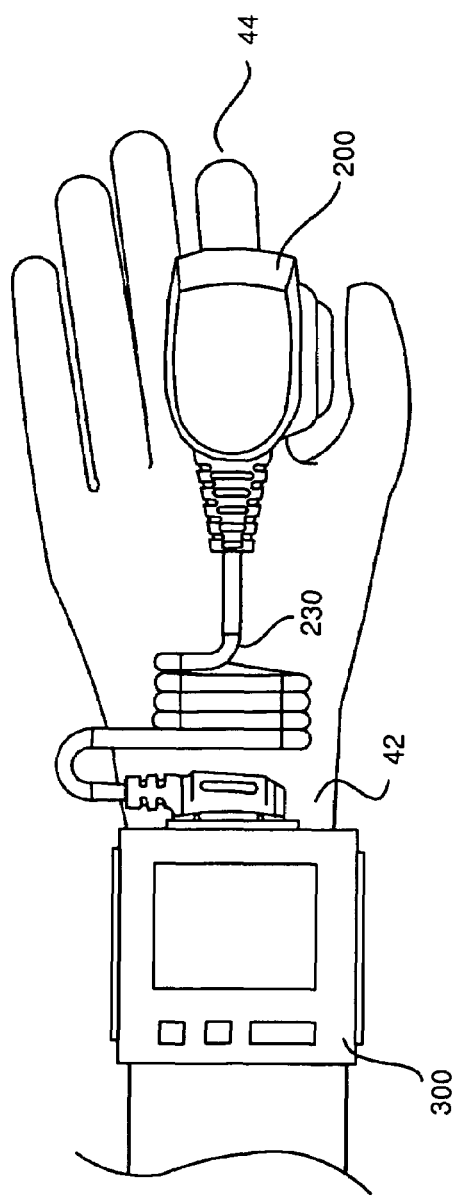
FIG. 4 is a top view of the device of FIG. 2 in a first wearing position.

FIG. 4 shows an exemplary embodiment of the device 200 when the cord 230 is in the relaxed state. As shown, the device 200 is worn over an index finger 44 and coupled to a computing device 300, which is worn on a wrist 42. The cord 230 rests on an anterior surface of the wrist 42, distal of the computing device 300. In one embodiment, the cord may be approximately 2.9" in the relaxed state. It will be understood that other positions may also produce the relaxed state. That is, there may be a range of relative positions (e.g., a first position range) for the device 200 and the computing device 300, in which the cord 230 is in the relaxed state. Depending on a relative position within the first position range, the coils of the cord 230 may be substantially resting together (as shown in FIG. 4) or spaced slightly apart.

Figure 5:
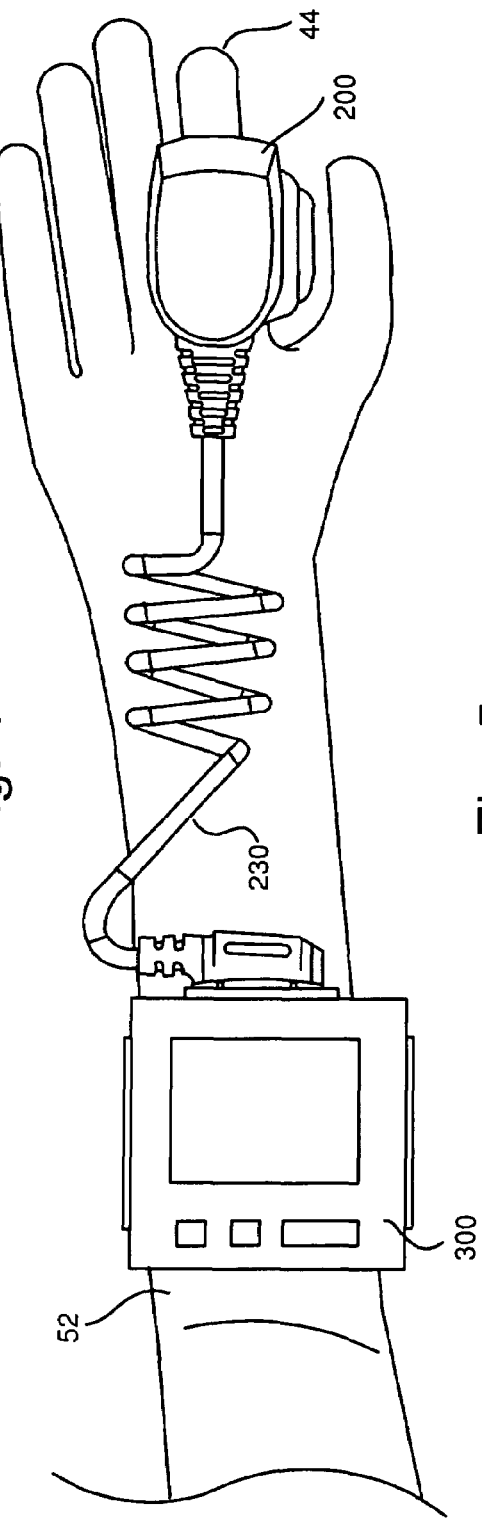
FIG. 5 is a top view of the device of FIG. 2 in a second wearing position.

FIG. 5 shows an exemplary embodiment of the device 200 when the cord 230 is in the stretched state. As shown, the device 200 is worn over the index finger 44 and coupled to the computing device 300, which is worn on a forearm 52. The cord rests on an anterior surface of the forearm, and may, in one embodiment, by approximately 10.5" when fully stretched (e.g., taut). However, the cord 230 may not necessarily be taut in the stretched state. For example, the relative position of the device 200 and the computing device 300 as shown in FIG. 5 may correspond to one of several positions (e.g., a second position range) in which the cord 230 is in the stretched state. Depending on a relative position within the second position range, the coils of the cord 230 may be substantially spaced apart, or the coils may be substantially nonexistent (e.g., a substantial portion of the coiled section 234 becomes linear as a result of stretching).

In designing the cord 230, the manufacturer may optimize characteristics such as the length, for use in a range of positions (e.g., the first position range) while still allowing for comfortable usage when the housing 210 and the computing device are placed further apart (e.g., the second position range) or closer together (e.g., a third position range). For example, the length may be chosen so that the cord 230 has little or no slack in the first position range, is not taut in the second position range, and does not exhibit significant bowing in the third position range.

When the device 200 is worn, the cord 230 may be draped over at least a portion of the anterior surface of the wrist. If the computing device is worn on the forearm, the cord 230 may be draped further along the arm. It will be appreciated by those of skill in the art that, because of the oval shape of the coils, the cord 230 requires fewer coils than a conventional data acquisition device using a helical cord. In order to achieve a given length, fewer coils are required because each coil in the present invention has a substantially larger circumference than that of the helical coil. Thus, the cord 230 may be less likely to kink or tangle.

When draped across the wrist in the relaxed state, at least one of the elongated members 257 are resting against the surface of the wrist. Because the length is sized appropriately (e.g., there is little or no slack), and because the elongated members 257 do not curve away from the surface of the wrist (unlike the helical cord), the cord 230 resists lateral movement such as outward bowing and slippage. Thus, the user's view of the computing device is not obstructed.

In addition, the cord 230 can also comfortably accommodate placement of the computing device at the forearm. When draped across the forearm in the stretched state, the coiled section 234 is placed in a state of tension. However, tension in the cord 230 is decreased compared to the helical cord because the elongated members 257 remain in a substantially relaxed state. The semi-circular members 255 perform a majority of the stretching by deforming under tensile stress so that the tension is concentrated at the semi-circular members 255 rather than at the elongated members 257, which may not need to stretch. In contrast, the helical coil distributes tension across the entire body of the coil. As a result, the helical coil may require more force in order to stretch. Thus, the cord 230 is less tiring when used over an extended period of time and allows the user to remain relaxed. Furthermore, because the cord 230 is not stretched taut, less contact is made with the user's skin, which reduces a likelihood of frictional discomfort.

Figure 6:
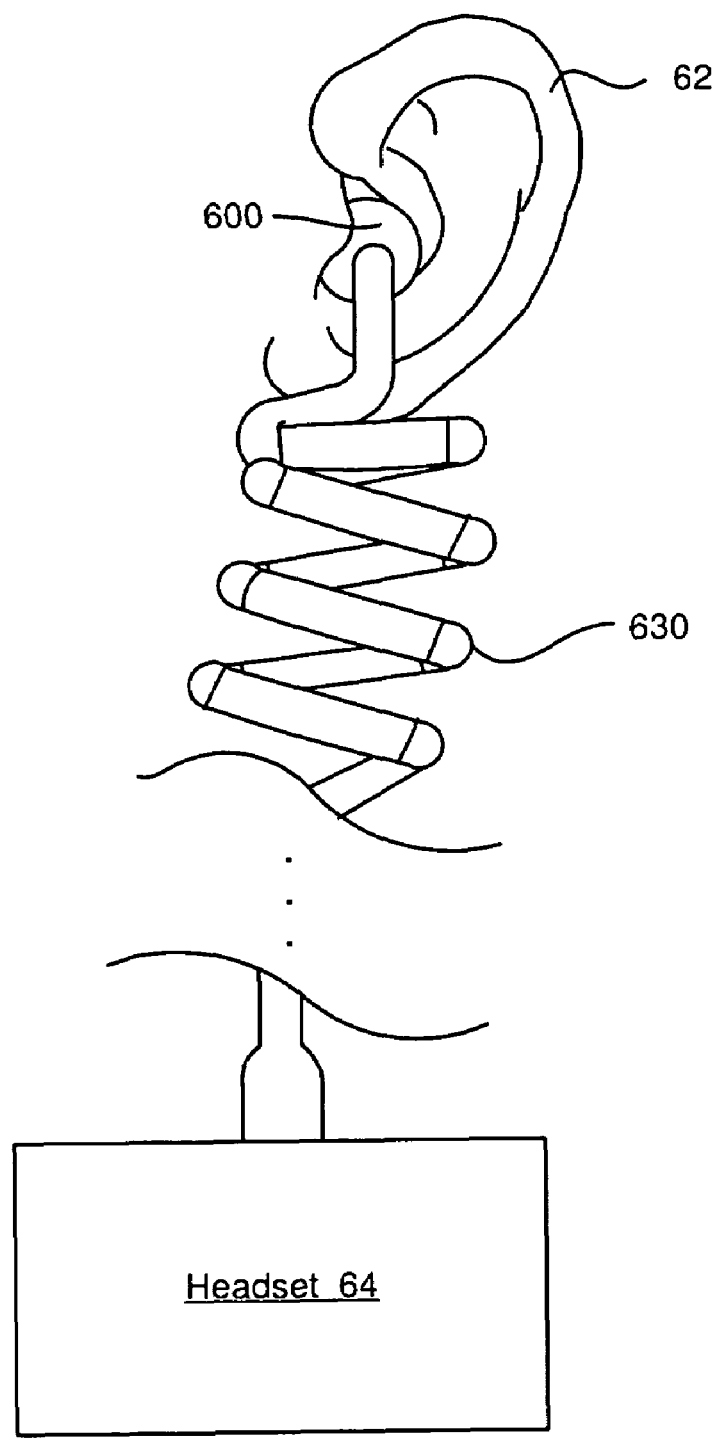
FIG. 6 shows an exemplary embodiment of another mobile device according to the present invention.

As stated above, the present invention may be implemented in any mobile device that utilizes a cord. For example, FIG. 6 shows an exemplary embodiment of an earpiece 600, which is adapted to be worn on an outer ear 63. The earpiece 600 may be coupled via a cord 630 to an audio device, such as a headset 64. The headset 64 may, like the computing device 300 of FIGS. 3 and 4, be worn at a number of different locations. For example, the headset 64 may be worn in conjunction with an armband, a belt holster, placed in a pocket, held in a hand, etc. Thus, the earpiece 600 and the device 300 may also have a plurality of relative positions in which the cord 630 may be in a relaxed or stretched state.

The present invention has been described with reference to the above exemplary embodiments. One skilled in the art would understand that the present invention may also be successfully implemented if modified. Accordingly, various modifications and changes may be made to the embodiments without departing from the broadest spirit and scope of the present invention as set forth in the claims that follow. The specification and drawings, accordingly, should be regarded in an illustrative rather than restrictive sense.

What is claimed is:

1. An arrangement, comprising:
    a first connector coupled to a first device;
    a second connector coupled to a second device;
    a cable connecting the first and second connectors, at least a portion of the cable forming at least one coil which has a substantially oval shape,
    wherein at least one of the first and second devices is a user-wearable device.

2. The system of claim 1, wherein the at least one coil has at least four portions: (i) first and second portions each having a substantially semi-circular shape and situated on opposite ends of the at least one coil and (ii) third and fourth portions being elongated and substantially parallel to each other.

3. The system of claim 1, wherein the first device is a data acquisition device and the second device is a data processing device that receives data from the first device via the cable.

4. The system of claim 1, wherein the first device includes one of an imager, a barcode scanner, an RFID reader, a media player, a global positioning device, a walkie-talkie and a mobile computer.

5. The system of claim 1, wherein the first device is worn on a body of the user and the second device is located away from the body.

6. The system of claim 1, wherein the first and second devices are worn on separate body locations of the user.

7. The system of claim 1, wherein the wearing location of the at least one device is one of a wrist, a forearm, an upper arm, a finger, a palm, an ear, a clothes pocket and a belt.

8. The system of claim 2, wherein when the first and second devices are placed in operative positions relative to each other, the cord is in a stretched state in which the first and second portions are deformed into a substantially linear shape.

9. The system of claim 2, wherein when the first and second devices are placed in operative positions relative to each other, the cord is in a relaxed state in which the first and second portions retain a substantially semi-circular shape.

10. The system of claim 8, wherein when in the stretched state, the first and second portions are under greater tensile stress than the third and fourth portions.

11. The system of claim 8, wherein when in the stretched state, the first and second portions are capable of further deformation and stretching.

12. The system of claim 8, wherein when in the stretched state, tension in the cable is sufficiently low so as to allow the user's body to remain substantially relaxed.

13. The system of claim 9, wherein when in the relaxed state, at least one of the third and fourth portions are substantially flush with a surface of the user's body.

14. The system of claim 9, wherein when in the relaxed state, an elastic property of the coil allows the coil to be stretched using a natural body movement.

15. The system of claim 1, wherein the cable is integrally attached to at least one of the first and second devices.

16. The system of claim 1, wherein the cable is detachable from at least one of the first and second devices.

17. The system of claim 1, wherein after being stretched by a pulling force, the coil has sufficient elasticity to return to its original shape when the force is removed.

18. A system, comprising:
   a first device including a first connector;
   a second device including a second connector; and
   a coupling arrangement coupling the first and second devices, the coupling arrangement including a third connector coupled to the first connector, a fourth connector coupled to the second connector and at least one coil connecting the third and fourth connectors; the at least one coil having a substantially oval shape,
   wherein at least one of the first and second devices is worn by a user.

19. A system, comprising:
   a first connection means for coupling to a first device;
   a second connection means for coupling to a second device; and
   a connecting means for connecting the first and second connection means, at least a portion of the connecting means forming at least one coil which has a substantially oval shape,
   wherein at least one of the first and second devices is a user-wearable device.

20. A cable for connecting a first device to a second device, comprising:
   a wire having a first end, a second end and an intermediate portion situated between the first and second ends, the first end being coupled to the first device and the second end being coupled to the second device, at least a portion of the intermediated portion forming a plurality of coils, at least one of the coils having a substantially oval shape,
   wherein at least one of the first and second devices is a user-wearable device.

* * * * *